(12) United States Patent
King et al.

(10) Patent No.: US 8,402,542 B2
(45) Date of Patent: Mar. 19, 2013

(54) NON-SENSITIVE-PASSAGE DATABASE FOR CUT-AND-PASTE ATTACK DETECTION SYSTEMS

(75) Inventors: Tracy H. King, Mountain View, CA (US); Philippe J. P. Golle, San Francisco, CA (US); John T. Maxwell, III, Santa Clara, CA (US); Jessica N. Staddon, Redwood City, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 496 days.

(21) Appl. No.: 12/546,493

(22) Filed: Aug. 24, 2009

(65) Prior Publication Data

US 2011/0047619 A1 Feb. 24, 2011

(51) Int. Cl.
*H04L 29/06* (2006.01)
(52) U.S. Cl. ........................................................ 726/23
(58) Field of Classification Search ..................... 726/23
See application file for complete search history.

(56) References Cited

U.S. PATENT DOCUMENTS

| | | | | |
|---|---|---|---|---|
| 2005/0091537 | A1* | 4/2005 | Nisbet et al. | 713/201 |
| 2005/0268117 | A1* | 12/2005 | Simon | 713/193 |
| 2006/0212714 | A1* | 9/2006 | Ting et al. | 713/182 |
| 2008/0222734 | A1* | 9/2008 | Redlich et al. | 726/26 |

* cited by examiner

*Primary Examiner* — Jason Gee
(74) *Attorney, Agent, or Firm* — Shun Yao; Park, Vaughan, Fleming & Dowler LLP

(57) ABSTRACT

One embodiment provides a system that detects sensitive passages. During operation, the system receives a document and disassembles the document into a plurality of passages. For a respective passage, the system performs a search through a non-sensitive-passage database to determine whether the passage is a known non-sensitive passage. If so, the system marks the passage as non-sensitive, and if not, the system determines whether the passage triggers a cut-and-paste attack detection. If so, the system forwards the passage to an administrator and allows the administrator to determine whether the passage is non-sensitive and, further, to add the passage to the non-sensitive-passage database responsive to the administrator determining the passage to be non-sensitive.

24 Claims, 7 Drawing Sheets

NON-SENSITIVE-PASSAGE DATABASE FOR CUT-AND-PASTE ATTACK DETECTION SYSTEMS

BACKGROUND

1. Field

This disclosure is generally related to content detection systems. More specifically, this disclosure is related to enhancing the performance of a cut-and-paste attack detection system by establishing a non-sensitive-passage database.

2. Related Art

To safeguard a company's sensitive information, such as trade secrets and un-released financial reports, an automated system is often installed to monitor outgoing emails from the company's corporate email accounts in order to detect cut-and-paste attacks. Such attacks occur when sensitive material is "cut" out of one document and "pasted" into another. By recognizing sensitive materials included in the outgoing emails, either accidentally or intentionally, the cut-and-paste detection system is able to flag emails that contain sensitive materials.

In order for the cut-and-paste attack detection system to function properly, such a system needs to be trained beforehand so it can recognize sensitive materials. In order to train the detection system, a system administrator, or a person in the company responsible for detecting such attacks, provides the system with a number of sensitive documents as training documents. Because often there is no indication of which parts of the training documents are sensitive or why they are sensitive, the system fingerprints (for example, by generating hash values) the training document in their entirety, paragraph by paragraph, or sentence by sentence, and stores the resulting fingerprints.

During operation, the system compares the fingerprints of an outgoing email with stored document fingerprints to detect sensitive materials contained in the email. Using this technique, the system can effectively detect any paragraphs which refer to the same content or topic but with different words or phrasing, or passages of a given length, that are pasted to an outgoing email from the sensitive documents, because all passages in the sensitive documents are treated as sensitive. However, such an approach has several drawbacks. For example, boilerplates in the training documents (e.g., the company logo, the URL of the company website, and standard "legalese" that states that the company is a privately held entity, etc.) will always trigger the cut-and-paste attack detection system to flag an outgoing email. Such flagging is unnecessary and can consume a great amount of resources of the company since the flagged emails often require manual inspection by the system administrator to determine whether they are safe to be sent. In addition, without knowing which parts of the sensitive documents are sensitive, the system cannot detect other potentially sensitive documents or paragraphs. What is needed is a system that can accurately distinguish non-sensitive passages, such as boilerplates, from sensitive passages within a sensitive document, thus preventing unnecessary flagging of emails that contain only non-sensitive passages.

SUMMARY

One embodiment provides a system that detects sensitive passages. During operation, the system receives a document and disassembles the document into a plurality of passages. For a respective passage, the system performs a search through a non-sensitive-passage database to determine whether the passage is a known non-sensitive passage. If so, the system marks the passage as non-sensitive, and if not, the system determines whether the passage triggers a cut-and-paste attack detection. If so, the system forwards the passage to an administrator and allows the administrator to determine whether the passage is non-sensitive and, further, to add the passage to the non-sensitive-passage database responsive to the administrator determining the passage to be non-sensitive.

In a variation on this embodiment, the system adds the passage to a sensitive-passage database responsive to the administrator determining the passage to be sensitive.

In a variation on this embodiment, the system determines whether a combination of two non-sensitive passages is sensitive, and responsive to the combination being sensitive, the system blocks the release of one of the two non-sensitive passages if the other one is previously released.

In a further variation, determining whether the combination of two non-sensitive passages is sensitive includes performing searches through a corpus based on the combination of the two passages, and determining hit counts returned for each passage and for the combination, and determining whether the combination of the two passages is sensitive based on the hit count for the combination and the hit counts for the individual passages.

In a variation on this embodiment, the system releases the document if the passages triggering the cut-and-paste attack detection are determined to be non-sensitive.

In a variation on this embodiment, the non-sensitive-passage database includes contents from a public domain.

In a further variation, the public domain includes company-related external web pages, marketing brochures, and news reports.

In a variation on this embodiment, determining whether the passage triggers the cut-and-paste attack detection includes fingerprinting the passage and comparing the passage's fingerprint with stored fingerprints of a set of training documents.

DETAILED DESCRIPTION

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

Overview

Embodiments of the present invention provide a cut-and-paste attack detection system that detects sensitive passages by searching through a non-sensitive-passage database. During operation, the system receives a document and compares passages within the document with the content of a non-sensitive-passage database. The system marks each passage that is known to be non-sensitive and fingerprints the rest of the document to determine whether a cut-and-paste attack is detected. Once such an attack is detected, the system forwards the passage that triggers the attack detection to a system administrator who then examines and determines whether the passage is truly sensitive. If a passage is determined to be non-sensitive, it is added to the non-sensitive-passage database. Over time, the system gradually accumulates the content of the non-sensitive database, thus effectively preventing false alarms of cut-and-paste attacks. The maintenance of a non-sensitive database enhances the system's efficiency in detecting sensitive materials.

Cut-and-Paste Attack Detection System

Figure 1:
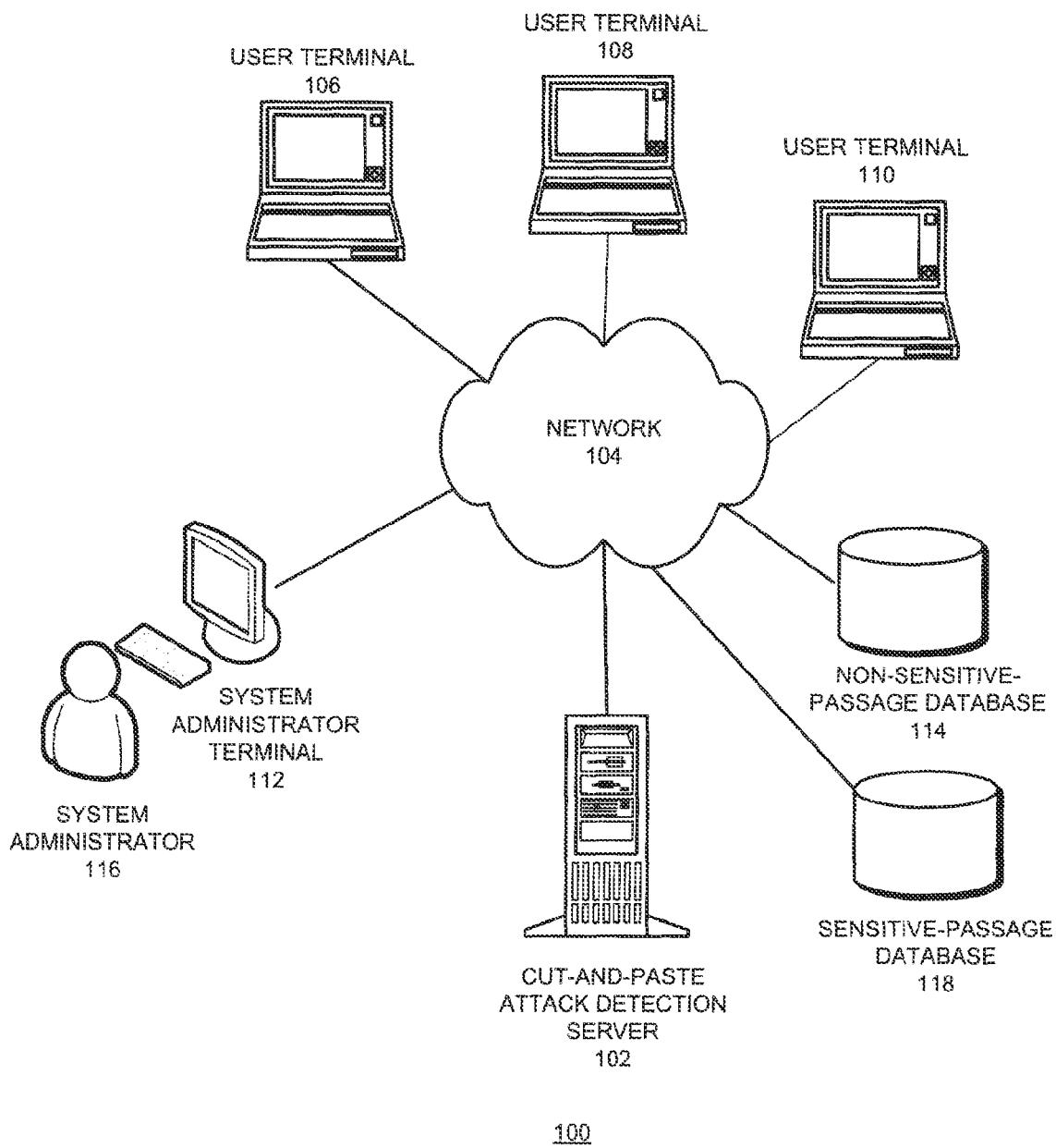
FIG. 1 presents a diagram illustrating an exemplary architecture for a computing environment associated with a cut-and-paste attack detection system in accordance with an embodiment of the present invention.

FIG. 1 illustrates an exemplary architecture for a computing environment 100 associated with a cut-and-paste attack detection server 102 in accordance with an embodiment of the present invention. In one embodiment, computing environment 100 includes a cut-and-paste attack detection server 102, a network 104, a number of user terminals 106-110, a system administrator terminal 112, a non-sensitive-passage database 114, and a sensitive-passage database 118. Network 104 can include any type of wired or wireless communication channel. In one embodiment, network 104 includes the Internet.

During operation, cut-and-paste attack detection server 102 receives a document sent by one of the user terminals 106-110 via network 104 and detects possible cut-and-paste attacks by comparing passages in the document with previously obtained training documents, content in non-sensitive-passage database 114, and content in sensitive-passage database 118. The flagged passages (possibly sensitive passages) are forwarded to system administrator terminal 112 to be examined by system administrator 116. If system administrator 116 determines that the flagged passage is non-sensitive, the passage is added to non-sensitive-passage database 114. If system administrator 116 determines that the flagged passage is sensitive, the passage is added to sensitive-passage database 118.

User terminals 106-110 can include any node with computational capability and a communication mechanism for communicating with cut-and-paste attack detection server 102 through network 104. In some embodiments of the present invention, user terminals 106-110 may correspond to a personal computer (PC), a laptop computer, a workstation, and/or another electronic computing device with network connectivity. Furthermore, user terminals 106-110 may couple to network 104 using wired and/or wireless connection.

Similarly, cut-and-paste attack detection server 102 may correspond to a node that includes functionality of detecting cut-and-paste attacks originated from user terminals 106-110. For example, server 102 may detect a cut-and-paste attack from an outgoing email originating from user terminal 106. Cut-and-paste attack detection server 102 may be a computing cluster, or a stand-alone server.

A system administrator 116 accesses the cut-and-paste attack detection server 102 via system administrator terminal 112. System administrator 116 is responsible for maintaining and training of cut-and-paste attack detection server 102. In one embodiment, system administrator terminal 112 resides on cut-and-paste attack detection server 102.

Non-sensitive-passage database 114 and sensitive-passage database 118 can generally include any type of system for storing data in volatile or non-volatile storage. This includes, but is not limited to: systems based upon magnetic, optical, and magneto-optical storage devices, as well as storage devices based on flash memory and/or battery-backed up memory. Non-sensitive-passage database 114 and sensitive-passage database 118 can be a stand-alone database or part of cut-and-paste attack detection server 102.

Figure 2:
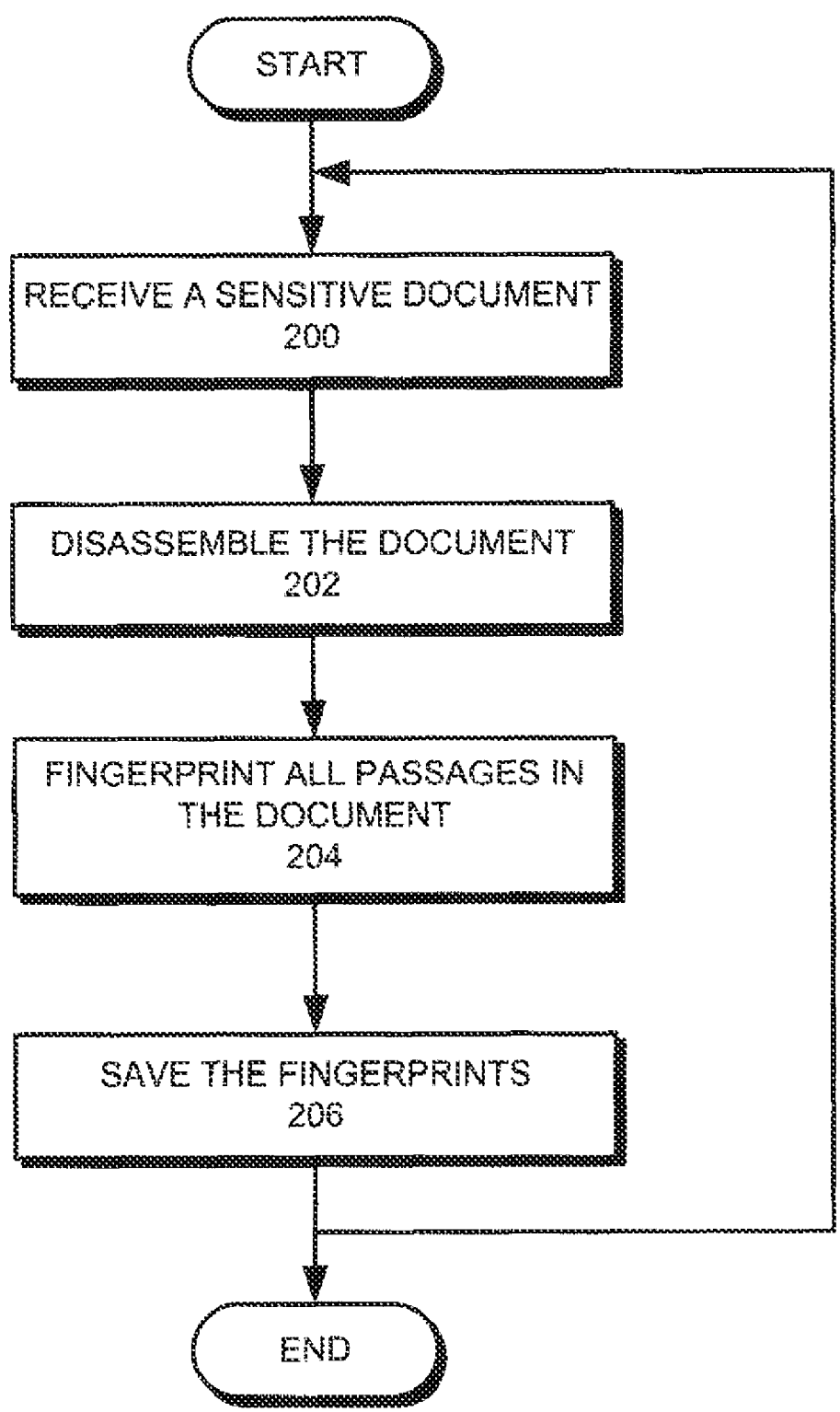
FIG. 2 presents a flow chart illustrating a process of training a cut-and-paste attack detection system.

FIG. 2 presents a flow chart illustrating a process of training a conventional cut-and-paste attack detection system. During training, the system receives a sensitive training document (operation 200). The system disassembles the document into paragraphs or passages of a given length (operation 202) and fingerprints the document based on the paragraphs or the passages (operation 204). In one embodiment, the system generates a fingerprint by computing a hash value based on the passage. The system saves the fingerprints (operation 206) and continues to receive the next training document (operation 200).

Figure 3:
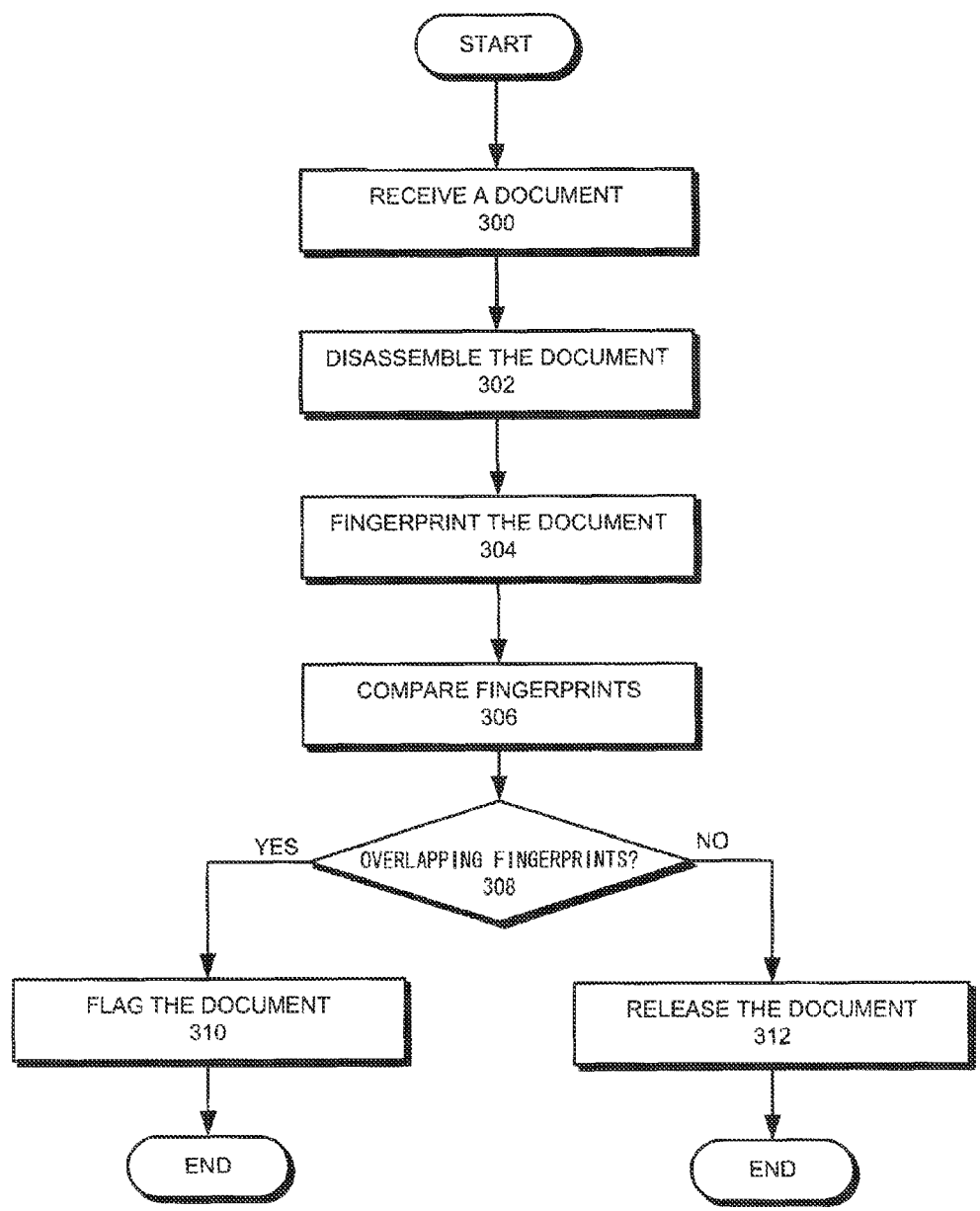
FIG. 3 presents a flow chart illustrating a process of detecting a cut-and-paste attack using a conventional cut-and-paste attack detection system.

FIG. 3 presents a flow chart illustrating a process of detecting a cut-and-paste attack using a conventional cut-and-paste attack detection system. During operation, the system receives a document (operation 300) and disassembles the document into paragraphs or passages of a given length (operation 302). The system fingerprints the document based on the paragraphs or the passages (operation 304) and compares the fingerprints with stored fingerprints obtained from training documents (operation 306). The system then determines whether there is an overlap between the newly acquired document fingerprints and the stored fingerprints (operation 308). If so, the system flags the document as containing sensitive materials (operation 310). Otherwise, the system releases the document (operation 312).

As one can see from FIGS. 2 and 3, because all passages of the training documents (including the boilerplates) are fingerprinted, overlapping of fingerprints between a received document and the training documents can happen even if the received document does not contain any sensitive material. For example, the sensitive training document may contain the URL of the company website, and any outgoing emails that contain the same URL can trigger the flagging of the cut-and-paste attack detection system. Consequently, the system might be overwhelmed by the amount of false "attacks" being detected.

Non-Sensitive-Passage Database

In order to avoid unnecessary flagging, and in the meantime, to maintain the system's ability to detect cut-and-paste attacks, in one embodiment, a non-sensitive-passage database is established to store known non-sensitive passages. By comparing received documents with known non-sensitive passages stored in the database, the amount of unnecessary flagging can be reduced. Note that the word "database" is used here in a loose sense. A "non-sensitive-passage database" can be any memory or storage device that stores a list of passages that are confirmed to be non-sensitive. The list of non-sensitive passages can either be indexed or non-indexed. A passage can be, but is not limited to: a number, a string, a word, a phrase, a hyperlink, a sentence, a paragraph, a figure, a picture, and other possible components of a document.

Figure 4:
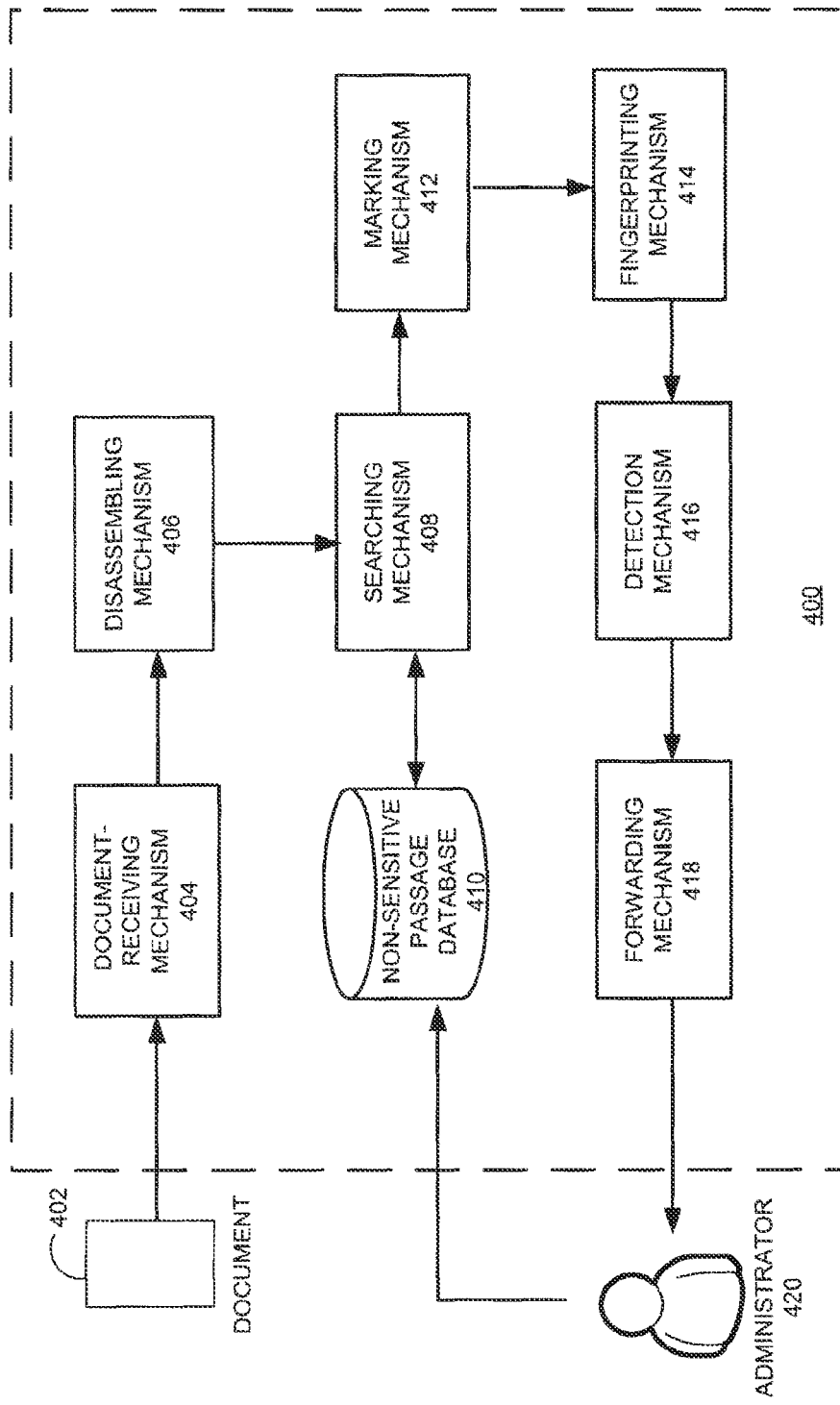
FIG. 4 presents a block diagram illustrating an exemplary architecture of a cut-and-paste attack detection system in accordance with an embodiment of the present invention.

FIG. 4 presents a block diagram illustrating an exemplary architecture of a cut-and-paste detection system in accordance with an embodiment of the present invention. A cut-and-paste attack detection system 400 includes a document-receiving mechanism 404, a disassembling mechanism 406, a searching mechanism 408, a non-sensitive-passage database 410, a marking mechanism 412, a fingerprinting mechanism 414, a detection mechanism 416, and a forwarding mechanism 418. During operation, document-receiving mechanism 404 receives a document 402 and sends it to disassembling mechanism 406 which disassembles document 402 into a number of passages based on contextual information. Searching mechanism 408 searches non-sensitive-passage database 410 for any overlapping between passages in document 402 and the content in non-sensitive-passage database 410. If such overlapping is found, marking mechanism marks such passages in document 402 as non-sensitive. Fingerprinting mechanism 414 fingerprints the un-marked portions of document 402. The fingerprints of the un-marked portions of document 402 are sent to detection mechanism 416 for possible cut-and-paste attack detection. If such an attack is detected, forwarding mechanism 418 forwards the passage that triggers the attack detection to a system administrator 420. System administrator 420 examines the forwarded passage and determines whether it is sensitive or non-sensitive. If system administrator 420 determines that the forwarded passage is non-sensitive, the forwarded passage is added to non-sensitive-passage database 410.

Figure 5A:
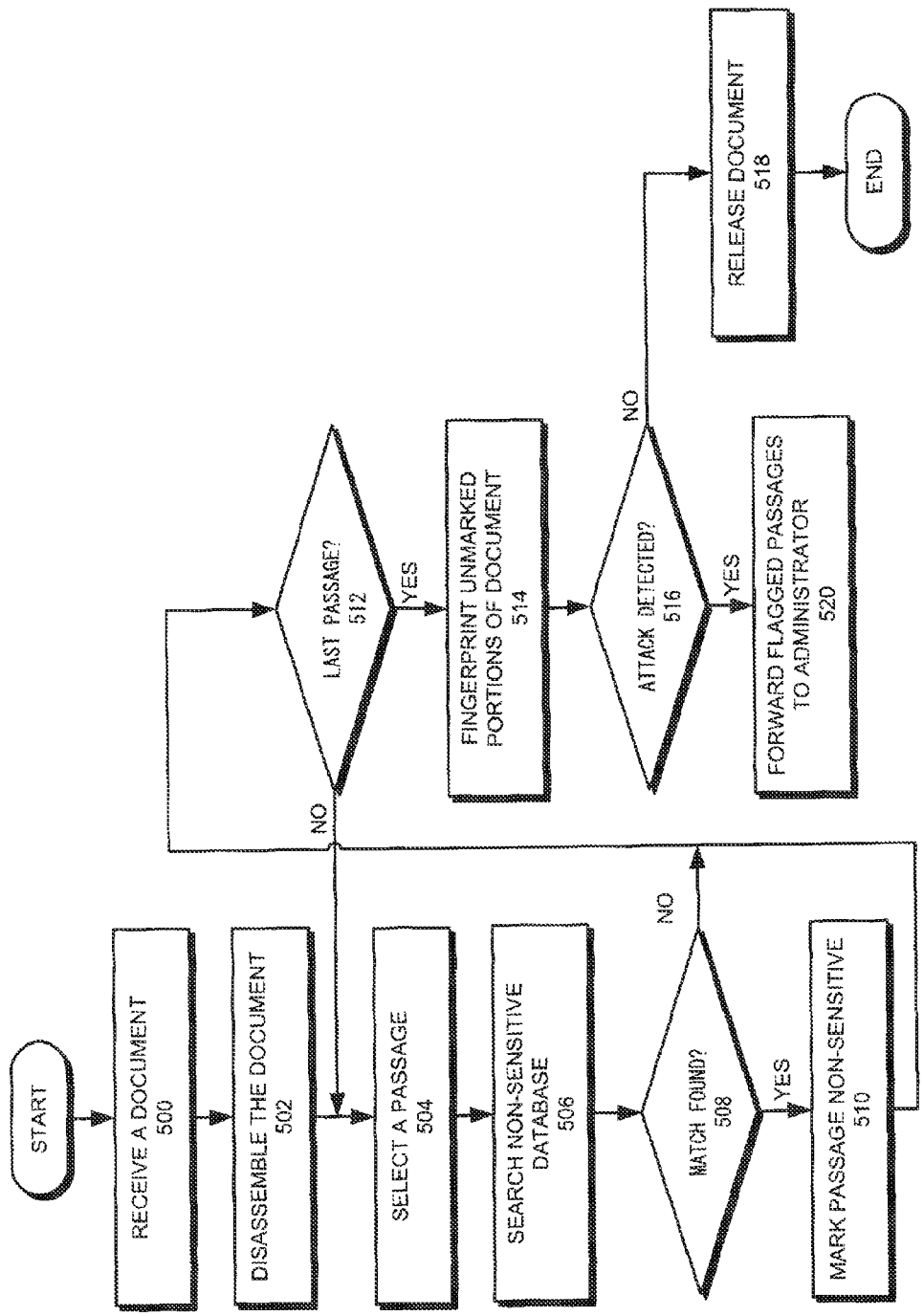
FIG. 5 presents a flow chart illustrating the process of detecting a cut-and-paste attack in accordance with an embodiment of the present invention.
Figure 5B:
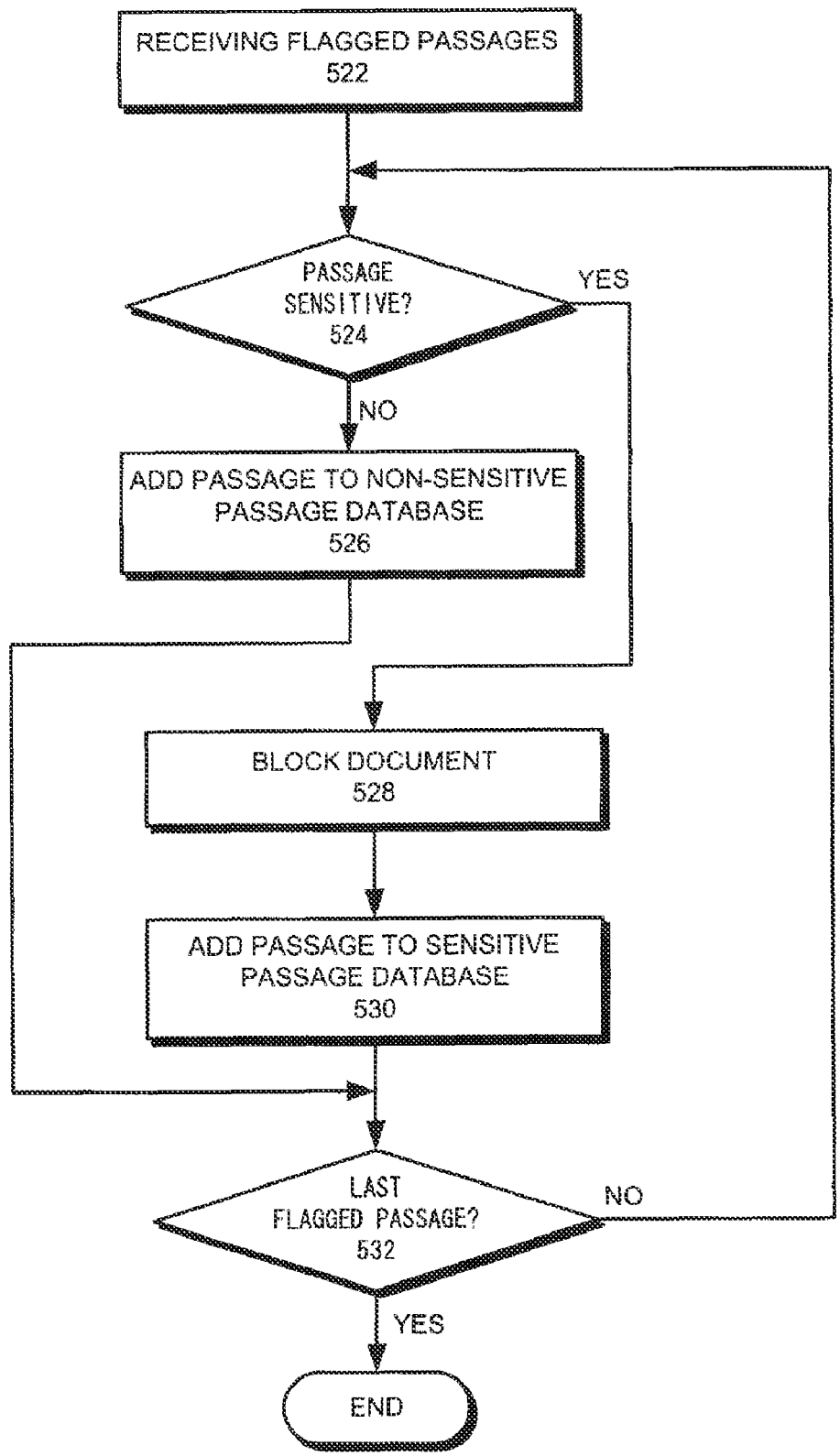

FIGS. 5A-5B present a flow chart illustrating the process of detecting a cut-and-paste attack in accordance with an embodiment of the present invention. During operation, the system receives a document (operation 500) and disassembles the document into a number of passages (operation 502). Note that the document can be disassembled into passages of various lengths. In one embodiment, the document is disassembled into paragraphs. The document can also be disassembled into sentences. Note that other disassembling granularities are also possible. Subsequently, the system selects a passage (operation 504) and uses the passage to search for a match in the non-sensitive-passage database (operation 506). If a match is found (operation 508), the passage is marked as non-sensitive (operation 510). Otherwise, the system determines whether the passage is the last passage in the document (operation 512).

If the system determines all passage haven been searched, the system fingerprints the unmarked portions of the document (operation 514) and determines whether there is a cut-and-paste attack (operation 516). A cut-and-paste detection scheme like the one shown in FIG. 3 can be used to detect such attacks. If no attack is detected, the system releases the document (operation 518). For example, the system may allow the delivery of an outgoing email, or the system may allow a document to be posted to the company's public website. Otherwise, the system forwards the passages triggering the attack, or the whole document, to a system administrator (operation 520). Note that the system administrator is often a person in the company who is in charge of guarding sensitive information.

The system administrator receives passages that have been flagged (operation 522) and determines whether a flagged passage is indeed sensitive (operation 524), and if not, the passage is added to the non-sensitive-passage database (operation 526). For example, if a boilerplate passage triggers the attack detection, the system administrator can easily add it to the non-sensitive-passage database, thus avoiding future false alarms caused by the same passage. In addition, the sensitivity of passages might vary over time. For example, a company's financial report is often considered sensitive before it is released to the public, and any content directly cut-and-pasted from such a report is considered an attack. However, such information is no longer considered sensitive once the report is released. To avoid any false alarm caused by content from a released report, the system administrator can, in a timely fashion, update the non-sensitive-passage database to include the de-classified information. Note that the passage can be added to the non-sensitive database by the system administrator manually, or the passage, once declared to be non-sensitive, can be automatically added to the non-sensitive database with proper indexing. In one embodiment, when a non-sensitive passage is added to the database, the name of the administrator that authorized its addition and the date are also recorded and stored in the database along with the passage.

If the system administrator determines that the passage is indeed sensitive, the document is blocked (operation 528), and the sensitive passage is added to a sensitive-passage database (operation 530). In addition, necessary security enforcement actions can be taken depending on the company's policy. In one embodiment, the email is bounced back to the sender indicating a security policy violation. The email can also be dropped without notifying the sender. The system administrator then determines whether the passage is the last flagged passage being examined (operation 532). If not, the system administrator continues to examine a next flagged passage (operation 524).

The non-sensitive database can be empty in the beginning. During initialization, a set of non-sensitive passages extracted from publicly available materials that pertains to the company can be seeded in the non-sensitive-passage database. Examples of publicly available materials include, but are not limited to: the company's public website, marketing brochures, and news reports related to the company. In addition, known boilerplates such as commonly used legal phrases can also be added to the non-sensitive-passage database during initialization. The content of the non-sensitive-passage database can be accumulated over time. At the beginning, when the non-sensitive-passage database is relatively empty, the system may experience a large number of false alarms. However, once a passage triggers a false alarm, it is added to the non-sensitive database, thus preventing future false alarms caused by the same passage. As a result, the number of positive false alarms goes down as the content of the non-sensitive-passage database builds up.

In addition to the non-sensitive-passage database, the system can also maintain a sensitive-passage database. When the system administrator determines that a passage triggering cut-and-paste attack detection is sensitive, the passage is added to the sensitive-passage database. By keeping track of both sensitive and non-sensitive passages, the cut-and-paste attack detection system can effectively detect possible attacks without risking excessive false alarms. In addition, keeping track of known sensitive passages can be used to identify other company documents that might be sensitive. The identified company documents may contain exact passages that match the known sensitive passages, or they may share common sensitive keywords with the known sensitive passages. Note that sensitive keywords can be determined based on TF-IDF (term frequency—inverse document frequency) or web-based inferencing as disclosed in U.S. application Ser. No. 12/208,091, entitled "Method and Apparatus for Detecting Sensitive Content in a Document," by inventor Jessica N. Staddon, filed 10 Sep. 2008, which is hereby incorporated by reference. After identifying such documents, the system can forward them to the system administrator, who in turn determines whether these semantically related documents should also be among the documents used by the system to detect cut-and-paste attacks.

In one embodiment of the present invention, the system uses knowledge of non-sensitive passages in conjunction with topic detection to increase the precision of content monitoring by alerting the user how the history of release may affect sensitivity. For example, a topic (or passage) A and a topic (or passage) B are known to be non-sensitive. By performing searches based on the combination of A and B through a large corpus, such as the Web, the system may determine that the combination of topic A and topic B is sensitive. As a result, when a document on topic A is considered for release, the system needs to determine whether documents on topic B have been released previously. If so, the system may block the release of the document on topic A. Note that when determining whether the combination of topic A and topic B is sensitive, the system performs searches for both individual topics and the combination of topics, and compares the hit counts for each of the individual topics and the combination. When the hit count of the combination is significantly lower (e.g., below a predetermined threshold) in comparison with the hit count for A or B alone, the system can determine that the combination of A and B is sensitive.

In addition to enhancing the performance of a cut-and-paste attack detection system, the gradual accumulation of confirmed non-sensitive passages and confirmed sensitive passages can also improve the performance of other sensitive data detection systems. For example, the confirmed sensitive and non-sensitive passages together with a large number of sensitive documents can provide more accurate training data for other sensitive data detection systems. Sensitive data detection algorithms often involve analyzing numerous noun groups, and discarding noun groups that pertain exclusively to non-sensitive passages can considerably improve the performance of such algorithms.

Figure 6:
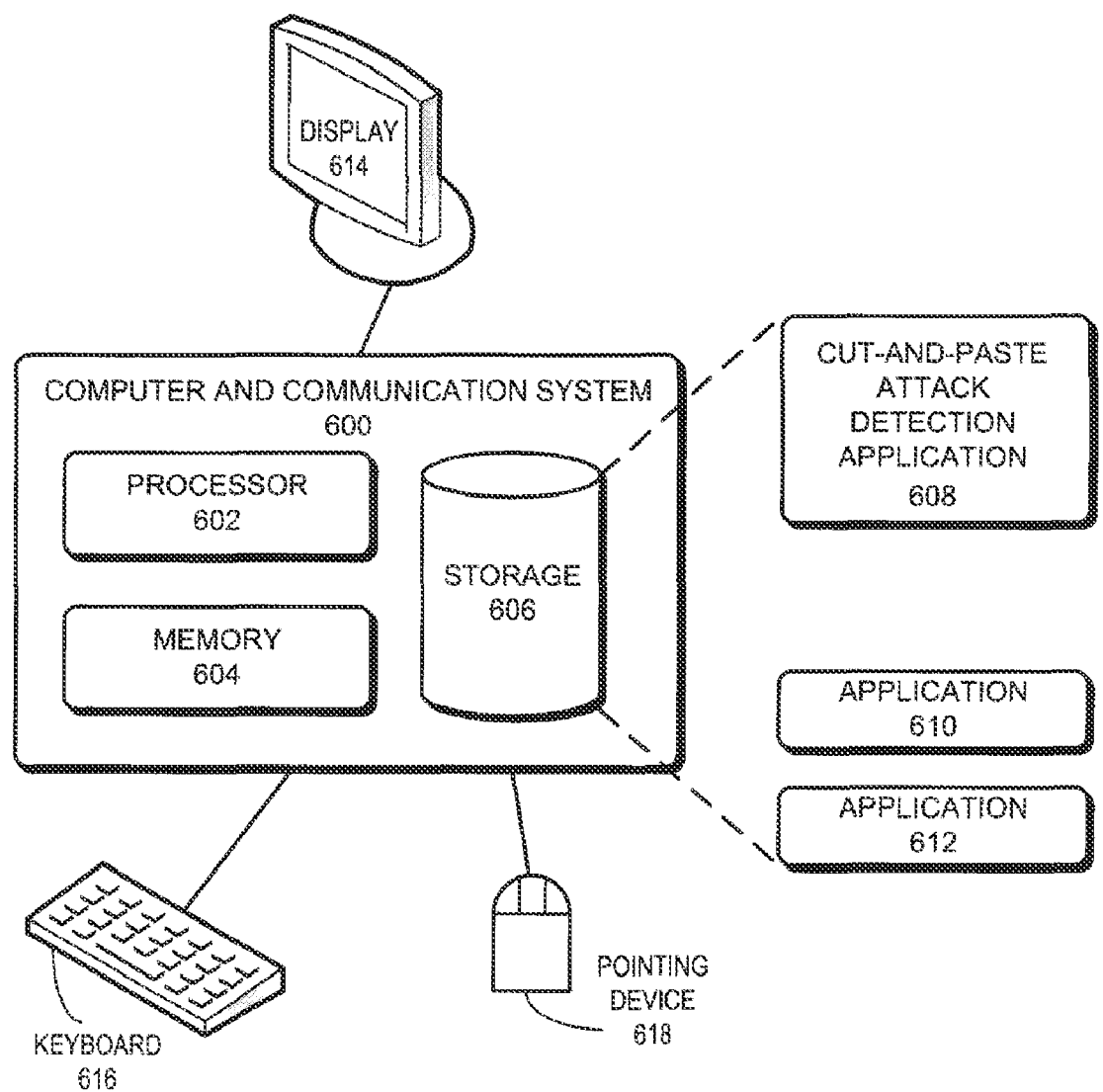
FIG. 6 presents a diagram illustrating an exemplary computer system that facilitates detecting cut-and-paste attacks in a document in accordance with an embodiment of the present invention.

FIG. 6 illustrates an exemplary computer system for detecting cut-and-paste attacks in accordance with one embodiment of the present invention. In one embodiment, a computer and communication system 600 includes a processor 602, a memory 604, and a storage device 606. Storage device 606 stores a cut-and-paste attack detection application 608, as well as other applications, such as applications 610 and 612. During operation, cut-and-paste attack detection application 608 is loaded from storage device 606 into memory 604 and then executed by processor 602. While executing the program, processor 602 performs the aforementioned functions. Computer and communication system 600 is coupled to an optional display 614, keyboard 616, and pointing device 618.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, methods and processes described herein can be included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention.

What is claimed is:

1. A computer-executable method for detecting sensitive passages, comprising:
   receiving, by a computer, a document;
   disassembling the document into a plurality of passages;
   performing a search for a respective passage through a non-sensitive-passage database to determine whether the passage is a known non-sensitive passage;
   responsive to determining the passage to be a known non-sensitive passage, marking the passage as non-sensitive;
   determining whether a combination of two non-sensitive passages in the plurality of passages is sensitive; and
   responsive to the combination being sensitive, blocking the release of one of the two non-sensitive passages if the other one is previously released.

2. The method of claim 1, further comprising:
   adding the passage to a sensitive-passage database responsive to determining the passage to be sensitive.

3. The method of claim 1, wherein determining whether the combination of two non-sensitive passages is sensitive comprises:
   performing searches through a corpus based on the combination of the two passages and determining hit counts returned for each passage and for the combination; and
   determining whether the combination of the two passages is sensitive based on the hit count for the combination and the hit counts for the individual passages.

4. The method of claim 1, wherein the non-sensitive-passage database comprises contents from a public domain.

5. The method of claim 4, wherein the public domain comprises company-related external web pages, marketing brochures, and news reports.

6. The method of claim 1, further comprising:
   responsive to determining that the passage is not known to be non-sensitive:
     determining that the passage triggers a cut-and-paste attack detection;
     forwarding the passage to an administrator to determine whether the passage is non-sensitive based on a feedback from the administrator; and
     responsive to determining the passage to be non-sensitive based on the feedback, adding the passage to the non-sensitive-passage database.

7. The method of claim 6, further comprising releasing the document in response to the passages triggering the cut-and-paste attack detections being determined to be non-sensitive.

8. The method of claim 6, wherein determining whether the passage triggers the cut-and-paste attack comprises:
fingerprinting the passage; and
comparing the passage's fingerprint with stored fingerprints of a set of training documents.

9. A computer-readable non-transitory storage medium storing instructions that when executed by a computer cause the computer to perform a method, the method comprising:
receiving a document;
disassembling the document into a plurality of passages;
performing a search for a respective passage through a non-sensitive-passage database to determine whether the passage is a known non-sensitive passage;
responsive to determining the passage to be a known non-sensitive passage, marking the passage as non-sensitive;
determining whether a combination of two non-sensitive passages in the plurality of passages is sensitive; and
responsive to the combination being sensitive, blocking the release of one of the two non-sensitive passages if the other one is previously released.

10. The computer-readable storage medium of claim 9, wherein the method further comprises: adding the passage to a sensitive-passage database responsive to determining the passage to be sensitive.

11. The computer-readable storage medium of claim 9, wherein determining whether the combination of two non-sensitive passages is sensitive comprises:
performing searches through a corpus based on the combination of the two passages and determining hit counts returned for each passage and for the combination; and
determining whether the combination of the two passages is sensitive based on the hit count for the combination and the hit counts for the individual passages.

12. The computer-readable storage medium of claim 9, wherein the non-sensitive-passage database comprises contents from a public domain.

13. The computer-readable storage medium of claim 12, wherein the public domain comprises company-related external web pages, marketing brochures, and news reports.

14. The computer-readable storage medium of claim 9, wherein the method further comprises:
responsive to determining that the passage is not known to be non-sensitive:
determining that the passage triggers a cut-and-paste attack detection;
forwarding the passage to an administrator to determine whether the passage is non-sensitive based on a feedback from the administrator; and
responsive to determining the passage to be non-sensitive based on the feedback, adding the passage to the non-sensitive-passage database.

15. The computer-readable storage medium of claim 14, wherein the method further comprises releasing the document in response to the passages triggering the cut-and-paste attack detections being determined to be non-sensitive.

16. The computer-readable storage medium of claim 14, wherein determining whether the passage triggers the cut-and-paste attack comprises:
fingerprinting the passage; and
comparing the passage's fingerprint with stored fingerprints of a set of training documents.

17. A system for detecting sensitive passages, comprising:
a receiving mechanism configured to receive a document;
a disassembling mechanism configured to disassemble the document into a plurality of passages;
a non-sensitive-passage database;
a searching mechanism configured to perform a search through a non-sensitive-passage database to determine whether a passage in the plurality of passages is a known non-sensitive passage;
a marking mechanism configured to mark the passage as non-sensitive responsive to determining the passage to be a known non-sensitive passage;
a detection mechanism configured to detect whether the passage triggers a cut-and-paste attack detection;
a determination mechanism configured to determine whether a combination of two non-sensitive passages in the plurality of passages is sensitive; and
a blocking mechanism configured to block the release of one of the two non-sensitive passages if the other one is previously released responsive to the combination being sensitive.

18. The system of claim 17, further comprising:
a sensitive-passage database, wherein a passage is added to the sensitive-passage database responsive to determining the passage to be sensitive.

19. The system of claim 17, wherein determining whether the combination of two non-sensitive passages is sensitive comprises:
performing searches through a corpus based on the combination of the two passages and determining hit counts returned for each passage and for the combination; and
determining whether the combination of the two passages is sensitive based on the hit count for the combination and the hit counts for the individual passages.

20. The system of claim 17, wherein the non-sensitive-passage database comprises contents from a public domain.

21. The system of claim 20, wherein the public domain comprises company-related external web pages, marketing brochures, and news reports.

22. The system of claim 17, further comprising:
a detection mechanism configured to detect whether the passage triggers a cut-and-paste attack detection;
a forwarding mechanism configured to forward the passage to an administrator to determine whether the passage is non-sensitive based on a feedback from the administrator responsive to determining that the passage is not known to be non-sensitive; and
an addition mechanism configured to add the passage to the non-sensitive-passage database responsive to determining the passage to be non-sensitive based on the feedback.

23. The system of claim 22, further comprising a mechanism configured to release the document in response to the passages triggering the cut-and-paste attack detections being determined to be non-sensitive.

24. The system of claim 22, wherein detecting whether the passage triggers the cut-and-paste attack comprises:
fingerprinting the passage; and
comparing the passage's fingerprint with stored fingerprints of a set of training documents.

* * * * *